United States Patent
Jozaki et al.

(10) Patent No.: US 8,241,178 B2
(45) Date of Patent: *Aug. 14, 2012

(54) CONTINUOUSLY VARIABLE TRANSMISSION AND CONTROL METHOD THEREOF

(75) Inventors: Tateki Jozaki, Yokohama (JP); Hideaki Suzuki, Yokohama (JP); Ryousuke Nonomura, Kawasaki (JP); Mamiko Inoue, Machida (JP); Seiichiro Takahashi, Isehara (JP); Tatsuo Ochiai, Oiso-machi (JP); Masato Koga, Hiratsuka (JP); Masaaki Uchida, Yokosuka (JP); Ryoji Kadono, Kawasaki (JP)

(73) Assignees: Jatco Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 213 days.

This patent is subject to a terminal disclaimer.

(21) Appl. No.: 12/727,516

(22) Filed: Mar. 19, 2010

(65) Prior Publication Data

US 2010/0248886 A1    Sep. 30, 2010

(30) Foreign Application Priority Data

Mar. 27, 2009 (JP) .................................. 2009-079679

(51) Int. Cl.
*F16H 61/662* (2006.01)

(52) U.S. Cl. ............................................. 477/48

(58) Field of Classification Search .............. 477/41, 477/46, 48
See application file for complete search history.

(56) References Cited

U.S. PATENT DOCUMENTS

| | | | |
|---|---|---|---|
| 4,672,863 A | 6/1987 | Itoh et al. | |
| 4,674,359 A | 6/1987 | Hattori | |
| 4,793,217 A | 12/1988 | Morisawa et al. | |
| 5,820,514 A * | 10/1998 | Adachi | 477/46 |
| 6,314,357 B1 | 11/2001 | Kon et al. | |
| 6,821,228 B2 | 11/2004 | Aoki et al. | |
| 6,855,085 B1 | 2/2005 | Gumpoltsberger | |
| 6,932,739 B2 | 8/2005 | Miyata et al. | |
| 7,108,631 B2 | 9/2006 | Inoue et al. | |
| 7,393,306 B2 | 7/2008 | Tanaka | |
| 7,637,836 B2 | 12/2009 | Watanabe et al. | |
| 7,833,126 B2 | 11/2010 | Venter | |
| 2005/0085340 A1 | 4/2005 | Ishikawa et al. | |

(Continued)

FOREIGN PATENT DOCUMENTS

DE    199 41 009 A1    3/2001

(Continued)

OTHER PUBLICATIONS

U.S. Appl. No. 12/727,497, filed Mar. 19, 2010, Jozaki et al.

(Continued)

*Primary Examiner* — Dirk Wright
(74) *Attorney, Agent, or Firm* — Foley & Lardner LLP

(57) ABSTRACT

A continuously variable transmission includes a variator capable of varying a speed ratio continuously, and a subtransmission mechanism provided in series with the variator. When an actual through speed ratio passes a predetermined mode switch speed ratio, a transmission controller performs a coordinated shift in which a gear position of the subtransmission mechanism is changed and a speed ratio of the variator is varied in an opposite direction to a speed ratio variation direction of the subtransmission mechanism. When the rapid deceleration is determined to be underway, the transmission controller decreases a speed ratio variation amount of the variator in the direction of a High side accompanied by a downshift of the subtransmission mechanism compared with the coordinated shift.

15 Claims, 5 Drawing Sheets

U.S. PATENT DOCUMENTS

| | | |
|---|---|---|
| 2006/0217230 A1 | 9/2006 | Tanaka |
| 2009/0105041 A1 | 4/2009 | McKenzie et al. |
| 2010/0248895 A1* | 9/2010 | Jozaki et al. ............ 477/44 |
| 2011/0015033 A1* | 1/2011 | Nonomura et al. ......... 477/37 |

FOREIGN PATENT DOCUMENTS

| | | |
|---|---|---|
| DE | 199 50 053 A1 | 4/2001 |
| JP | 60-037455 A | 2/1985 |
| JP | 62-181928 A | 8/1987 |
| JP | 63-125446 A | 5/1988 |
| JP | 04-307165 A | 10/1992 |
| JP | 05-079554 A | 3/1993 |
| JP | 8-178043 A | 7/1996 |
| JP | 11-51162 A | 2/1999 |
| JP | 11-108175 A | 4/1999 |
| JP | 2002-106700 A | 4/2002 |
| JP | 2006-112536 A | 4/2006 |
| JP | 2006-266320 A | 10/2006 |
| JP | 2007-092665 A | 4/2007 |
| JP | 2007-118727 A | 5/2007 |

OTHER PUBLICATIONS

U.S. Appl. No. 12/727,500, filed Mar. 19, 2010, Jozaki et al.
U.S. Appl. No. 12/727,506, filed Mar. 19, 2010, Jozaki et al.
U.S. Appl. No. 12/828,604, filed Jul. 1, 2010, Nonomura.
R. Nonmura, U.S. PTO Notice of Allowance, U.S. Appl. No. 12/828,604, dated Feb. 13, 2012, 17 pages.
T. Jozaki, U.S. PTO Office Action, U.S. Appl. No. 12/727,500, dated Apr. 30, 2012, 12 pages.
R. Nonomura, U.S. PTO Notice of Allowance, U.S. Appl. No. 12/828,604, dated Jun. 7, 2012, 12 pages.

* cited by examiner

CONTINUOUSLY VARIABLE TRANSMISSION AND CONTROL METHOD THEREOF

TECHNICAL FIELD OF THE INVENTION

This invention relates to a continuously variable transmission and a control method thereof, and more particularly to a continuously variable transmission comprising a belt continuously variable speed change mechanism and a subtransmission mechanism.

BACKGROUND OF THE INVENTION

JP60-37455A discloses a continuously variable transmission in which a two-forward speed subtransmission mechanism is provided in series with a belt continuously variable speed change mechanism (to be referred to hereafter as a "variator"), and a gear position of the subtransmission mechanism is changed in accordance with an operating condition of a vehicle. Thus, an achievable speed ratio range is enlarged without increasing the size of the variator.

JP5-79554A discloses control (to be referred to hereafter as a "coordinated shift") employed in this type of continuously variable transmission including a subtransmission mechanism for maintaining an overall speed ratio (to be referred to hereafter as a "through speed ratio") of the continuously variable transmission at a constant value by varying a speed ratio of the variator in accordance with change of the gear position of the subtransmission mechanism. When this coordinated shift is performed, speed variation occurring in an engine and a torque converter during a shift in the subtransmission mechanism is suppressed, thereby preventing shift shock caused by inertia torque from the engine and torque converter.

SUMMARY OF THE INVENTION

The speed ratio of the variator is controlled to return to a Lowest speed ratio before the vehicle stops. The reason for this is that if the speed ratio of the variator does not return to the Lowest speed ratio, the vehicle is subsequently started from a state in which the speed ratio of the variator is not at the Lowest speed ratio. In this case, sufficient startup driving force may not be obtained, and as a result, a startup performance deteriorates.

However, in the continuously variable transmission including a subtransmission mechanism described above, if deceleration is performed rapidly enough to stop the vehicle, it may be impossible to vary the speed ratio of the variator to the Lowest speed ratio before the vehicle stops. The reason for this is that in the aforementioned coordinated shift, the speed ratio of the variator must be varied temporarily to a High side when switching the subtransmission mechanism from a high speed to a low speed, leading to a corresponding increase in the amount of time required to vary the speed ratio of the variator to the Lowest speed ratio.

It is therefore an object of this invention to ensure that a speed ratio of a variator comes as close as possible to a Lowest speed ratio during rapid deceleration, leading to an improvement in startup performance at the time of a subsequent startup operation.

According to an aspect of the present invention, A continuously variable transmission installed in a vehicle, includes a belt continuously variable speed change mechanism (to be referred to hereafter as a "variator") capable of varying a speed ratio continuously, a subtransmission mechanism provided in series with the variator and having a first gear position and a second gear position, the second gear position having a smaller speed ratio than the first gear position, as forward gear positions, a destination through speed ratio setting unit which sets, on the basis of an operating condition of the vehicle, an overall speed ratio (to be referred to hereafter as a "through speed ratio") of the variator and the subtransmission mechanism to be realized in accordance with the operating condition as a destination through speed ratio, a shift control unit which controls at least one of the speed ratio of the variator and the gear position of the subtransmission mechanism such that an actual value of the through speed ratio (to be referred to hereafter as an "actual through speed ratio") becomes the destination through speed ratio, a coordinated shifting unit which performs a coordinated shift in which the gear position of the subtransmission mechanism is changed and the speed ratio of the variator is varied in an opposite direction to a speed ratio variation direction of the subtransmission mechanism when the actual through speed ratio passes a predetermined mode switch line, a rapid deceleration determining unit which determines rapid deceleration in the vehicle, and a non-coordinated shifting unit which, when the rapid deceleration is determined to be underway, decreases a speed ratio variation amount of the variator to a High side accompanied by a downshift of the subtransmission mechanism compared with the coordinated shift.

According to another aspect of the present invention, a control method for a continuously variable transmission that is installed in a vehicle and includes a belt continuously variable speed change mechanism (to be referred to hereafter as a "variator") capable of varying a speed ratio continuously, and a subtransmission mechanism provided in series with the variator and having a first gear position and a second gear position, the second gear position having a smaller speed ratio than the first gear position, as forward gear positions, is provided. The method includes a destination through speed ratio setting step for setting, on the basis of an operating condition of the vehicle, an overall speed ratio (to be referred to hereafter as a "through speed ratio") of the variator and the subtransmission mechanism to be realized in accordance with the operating condition as a destination through speed ratio, a shift control step for controlling at least one of the speed ratio of the variator and the gear position of the subtransmission mechanism such that an actual value of the through speed ratio (to be referred to hereafter as an "actual through speed ratio") becomes the destination through speed ratio, a coordinated shifting step for performing a coordinated shift in which the gear position of the subtransmission mechanism is changed and the speed ratio of the variator is varied in an opposite direction to a speed ratio variation direction of the subtransmission mechanism when the actual through speed ratio passes a predetermined mode switch line, a rapid deceleration determining step for determining rapid deceleration in the vehicle, and a non-coordinated shifting step in which, when the rapid deceleration is determined to be underway, a speed ratio variation amount of the variator to a High side accompanied by a downshift of the subtransmission mechanism is decreased compared with the coordinated shift.

Embodiments and advantages of this invention will be described in detail below with reference to the attached figures.

DESCRIPTION OF THE PREFERRED EMBODIMENTS

An embodiment of this invention will be described below with reference to the attached figures. It should be noted that in the following description, a "speed ratio" of a certain speed change mechanism is a value obtained by dividing an input rotation speed of the speed change mechanism by an output rotation speed of the speed change mechanism. Further, a "Lowest speed ratio" is a maximum speed ratio of the speed change mechanism and a "Highest speed ratio" is a minimum speed ratio of the speed change mechanism.

Figure 1:
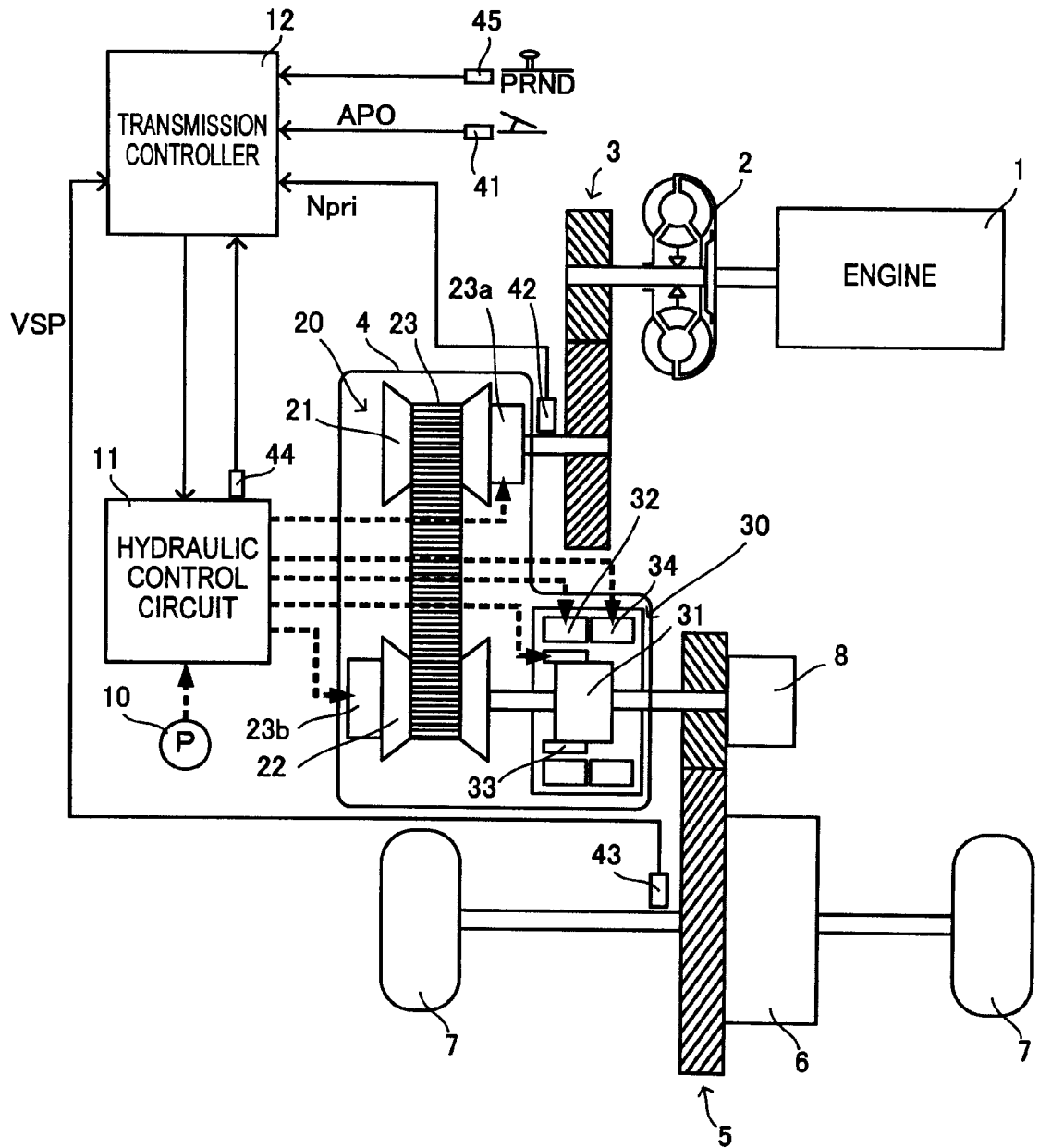
FIG. 1 is a schematic diagram showing a vehicle installed with a continuously variable transmission according to an embodiment of this invention.

FIG. 1 is a schematic diagram showing a vehicle installed with a continuously variable transmission according to an embodiment of this invention. The vehicle includes an engine 1 as a power source. An output rotation of the engine 1 is transmitted to drive wheels 7 via a torque converter 2 including a lockup clutch, a first gear train 3, a continuously variable transmission (to be referred to simply as a "transmission 4" hereafter), a second gear train 5, and a final reduction gear 6. The second gear train 5 is provided with a parking mechanism 8 which locks an output shaft of the transmission 4 mechanically during parking so that the output shaft of the transmission 4 cannot rotate.

Further, the vehicle is provided with an oil pump 10 that is driven using a part of the power of the engine 1, a hydraulic control circuit 11 that regulates an oil pressure from the oil pump 10 and supplies the regulated oil pressure to respective sites of the transmission 4, and a transmission controller 12 that controls the hydraulic control circuit 11.

The transmission 4 includes a belt continuously variable speed change mechanism (to be referred to hereafter as a "variator") 20, and a subtransmission mechanism 30 provided in series with the variator 20. Here, "provided in series" means that the variator 20 and the subtransmission mechanism 30 are provided in series on a power transmission path extending from the engine 1 to the drive wheels 7. The subtransmission mechanism 30 may be connected to an output shaft of the variator 20 directly, as in this example, or via another speed change/power transmission mechanism (a gear train, for example). Alternatively, the subtransmission mechanism 30 may be connected to a front stage (an input shaft side) of the variator 20.

The variator 20 includes a primary pulley 21, a secondary pulley 22, and a V belt 23 wrapped around the pulleys 21, 22. The pulleys 21, 22 respectively include a fixed conical plate, a movable conical plate disposed relative to the fixed conical plate such that respective sheave surfaces thereof oppose each other, thereby forming a V groove, and hydraulic cylinders 23a, 23b provided on a back surface of the movable conical plate so as to displace the movable conical plate in an axial direction. When oil pressure supplied to the hydraulic cylinders 23a, 23b is regulated, a width of the V groove varies, causing a contact radius between the V belt 23 and the respective pulleys 21, 22 to vary, and as a result, the speed ratio of the variator 20 is varied continuously.

The subtransmission mechanism 30 is a speed change mechanism having two-forward speed and single-reverse speed. The subtransmission mechanism 30 includes a Ravigneaux planetary gear mechanism 31 in which carriers of two planetary gears are coupled, and a plurality of frictional engagement elements (a Low brake 32, a High clutch 33, and a Rev brake 34) which are connected to a plurality of rotary elements constituting the Ravigneaux planetary gear mechanism 31 so as to modify rotation states thereof. When engagement/disengagement states of the respective frictional engagement elements 32 to 34 are modified by regulating oil pressures supplied to the respective frictional engagement elements 32 to 34, the gear position of the subtransmission mechanism 30 is changed.

For example, when the Low brake 32 is engaged and the High clutch 33 and Rev brake 34 are disengaged, the gear position of the subtransmission mechanism 30 becomes a first speed. When the High clutch 33 is engaged and the Low brake 32 and Rev brake 34 are disengaged, the gear position of the subtransmission mechanism 30 becomes a second speed in which the speed ratio is smaller than that of the first speed. Further, when the Rev brake 34 is engaged and the Low brake 32 and High clutch 33 are disengaged, the gear position of the subtransmission mechanism 30 becomes the reverse speed. In the following description, the terms "the transmission 4 is in a low speed mode" and "the transmission 4 is in a high speed mode" will be used to indicate that the gear position of the subtransmission mechanism 30 corresponds to the first speed and the second speed, respectively.

Figure 2:
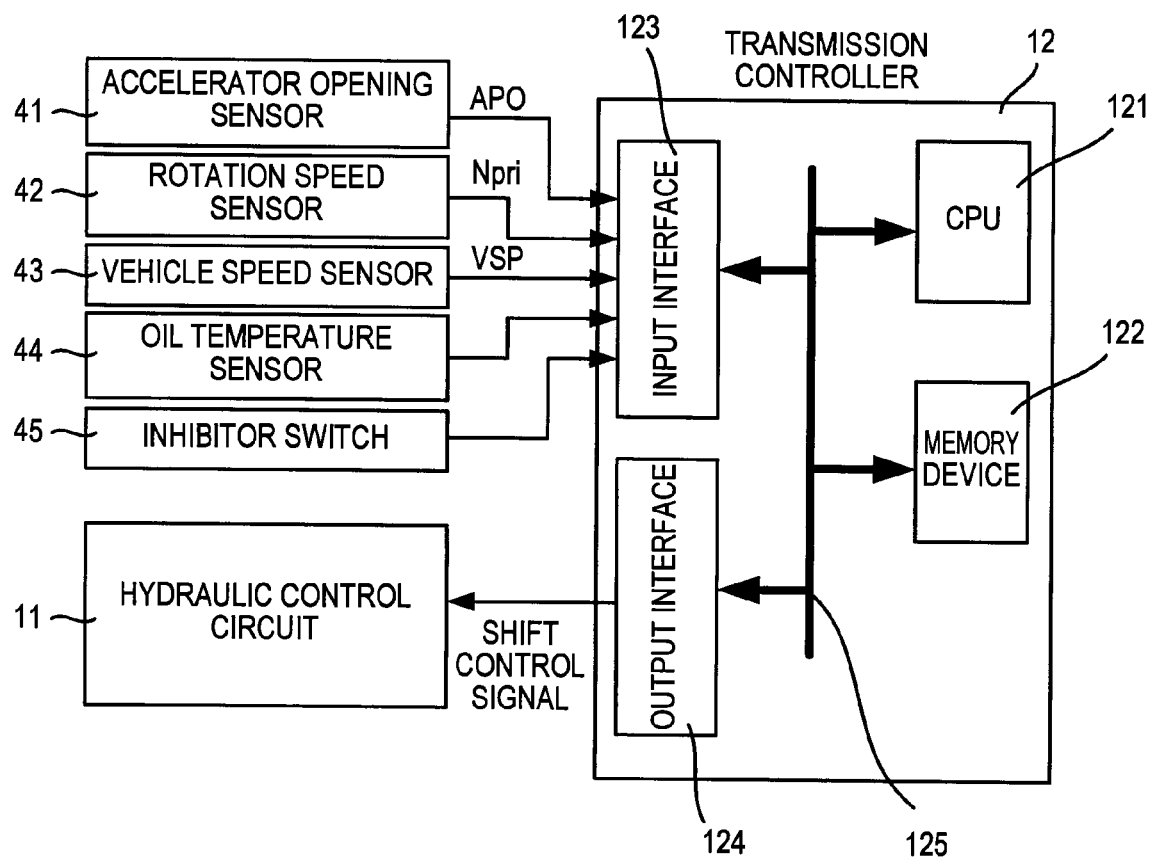
FIG. 2 is a view showing an internal constitution of a transmission controller.

As shown in FIG. 2, the transmission controller 12 is constituted by a CPU 121, a memory device 122 including a RAM and a ROM, an input interface 123, an output interface 124, and a bus 125 that connects these components to each other.

An output signal from an accelerator opening sensor 41 that detects an accelerator opening APO, which is an operating amount of an accelerator pedal, an output signal from a rotation speed sensor 42 that detects an input rotation speed of the transmission 4 (=a rotation speed of the primary pulley 21; to be referred to hereafter as a "primary rotation speed Npri"), an output signal from a vehicle speed sensor 43 that detects a vehicle speed VSP, an output signal from an oil temperature sensor 44 that detects an oil temperature TMP of the transmission 4, an output signal from an inhibitor switch 45 that detects a position of a select lever, and so on are input into the input interface 123.

The memory device 122 stores a shift control program (FIG. 4) of the transmission 4, and a shift map (FIG. 3) used by the shift control program. The CPU 121 reads and executes the shift control program stored in the memory device 122, generates a shift control signal by implementing various types of calculation processing on the various signals input via the input interface 123, and outputs the generated shift control signal to the hydraulic control circuit 11 via the output interface 124. Various values used during the calculation processing executed by the CPU 121 and results of the calculation processing are stored in the memory device 122 as appropriate.

The hydraulic control circuit 11 is constituted by a plurality of flow passages and a plurality of hydraulic control valves. The hydraulic control circuit 11 controls the plurality of hydraulic control valves on the basis of the shift control signal from the transmission controller 12 to switch an oil pressure supply path, regulate the oil pressure generated by the oil pump 10 to a required oil pressure, and supply the regulated oil pressure to the respective sites of the transmission 4. Thus, the speed ratio of the variator 20 and the gear position of the subtransmission mechanism 30 are changed, whereby a shift is performed in the transmission 4.

Figure 3:
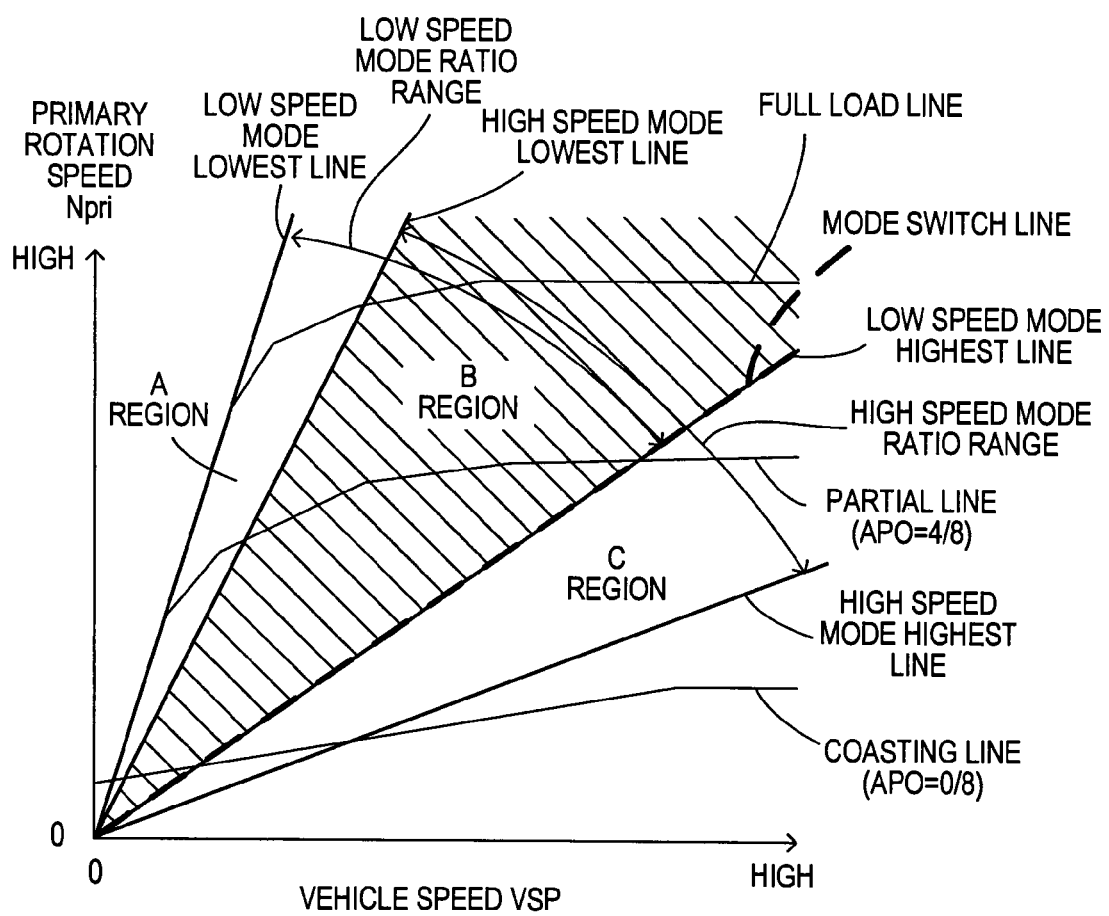
FIG. 3 is a view showing an example of a shift map.

FIG. 3 shows an example of the shift map stored in the memory device 122. The transmission controller 12 controls the variator 20 and the subtransmission mechanism 30 in accordance with operating conditions of the vehicle (in this embodiment, the vehicle speed VSP, the primary rotation speed Npri, and the accelerator opening APO) while referring to the shift map.

On the shift map, operating points of the transmission 4 are defined by the vehicle speed VSP and the primary rotation speed Npri. An incline of a line linking the operating point of the transmission 4 and a zero point in a lower left corner of the shift map corresponds to the speed ratio of the transmission 4 (an overall speed ratio obtained by multiplying the speed ratio of the subtransmission mechanism 30 by the speed ratio of the variator 20; to be referred to hereafter as a "through speed ratio"). On this shift map, similarly to a shift map of a conventional belt continuously variable transmission, a shift line is set for each accelerator opening APO, and a shift is performed in the transmission 4 in accordance with a shift line selected according to the accelerator opening APO. For the sake of simplicity, FIG. 3 shows only a full load line (a shift line when the accelerator opening APO=8/8), a partial line (a shift line when the accelerator opening APO=4/8), and a coasting line (a shift line when the accelerator opening APO=0/8).

When the transmission 4 is in the low speed mode, the transmission 4 can be shifted between a low speed mode Lowest line obtained by setting the speed ratio of the variator 20 at the Lowest speed ratio and a low speed mode Highest line obtained by setting the speed ratio of the variator 20 at the Highest speed ratio. Namely, in the low speed mode, the operating point of the transmission 4 moves within an A region and a B region in the figure. When the transmission 4 is in the high speed mode, on the other hand, the transmission 4 can be shifted between a high speed mode Lowest line obtained by setting the speed ratio of the variator 20 at the Lowest speed ratio and a high speed mode Highest line obtained by setting the speed ratio of the variator 20 at the Highest speed ratio. Namely, in the high speed mode, the operating point of the transmission 4 moves within the B region and a C region in the figure.

The speed ratio in each gear position of the subtransmission mechanism 30 is set such that the speed ratio corresponding to the low speed mode Highest line (the low speed mode Highest speed ratio) is smaller than the speed ratio corresponding to the high speed mode Lowest line (the high speed mode Lowest speed ratio). In so doing, a through speed ratio range of the transmission 4 that can be realized in the low speed mode (referred to as a "low speed mode ratio range" in the figure) partially overlaps a through speed ratio range of the transmission 4 that can be realized in the high speed mode (referred to as a "high speed mode ratio range" in the figure), and therefore, when the operating point of the transmission 4 is in the B region sandwiched between the high speed mode Lowest line and the low speed mode Highest line, the transmission 4 can select either the low speed mode or the high speed mode.

Furthermore, a mode switch line at which the subtransmission mechanism 30 performs a shift is set on the shift map to overlap the low speed mode Highest line. The through speed ratio corresponding to the mode switch line (to be referred to hereafter as a "mode switch speed ratio mRatio") is set at an equal value to the low speed mode Highest speed ratio. The reason for setting the mode switch line in this manner is because an input torque input into the subtransmission mechanism 30 decreases as the speed ratio of the variator 20 decreases and thus shift shock during a shift in the subtransmission mechanism 30 can be suppressed.

When the operating point of the transmission 4 crosses the mode switch line, or in other words when an actual value of the through speed ratio (to be referred to hereafter as an "actual through speed ratio Ratio") passes the mode switch shift ratio mRatio, the transmission controller 12 performs a coordinated shift to be described below in order to switch between the high speed mode and the low speed mode. Hereinafter, "the operation point of the transmission 4 crosses the mode switch line" is expressed as "the through speed ratio of the transmission 4 passes the mode switch line".

In the coordinated shift, the transmission controller 12 performs a shift in the subtransmission mechanism 30 and varies the speed ratio of the variator 20 in an opposite direction to a speed ratio variation direction of the subtransmission mechanism 30. The speed ratio of the variator 20 is varied in the opposite direction to the speed ratio variation direction of the subtransmission mechanism 30 to ensure that a driver does not experience an unpleasant feeling due to input rotation variation caused by a step in the actual through speed ratio Ratio.

More specifically, when the actual through speed ratio Ratio of the transmission 4 passes the mode switch line (the mode switch speed ratio mRatio) from the Low side to the High side, the transmission controller 12 changes the gear position of the subtransmission mechanism 30 from the first speed to the second speed (an upshift) and varies the speed ratio of the variator 20 to the Low side.

Conversely, when the actual through speed ratio Ratio of the transmission 4 passes the mode switch line (the mode switch speed ratio mRatio) from the High side to the Low side, the transmission controller 12 changes the gear position of the subtransmission mechanism 30 from the second speed to the first speed (downshift) and varies the speed ratio of the variator 20 to the High side.

However, that when the coordinated shift is performed during rapid deceleration in the vehicle, the speed ratio of the variator 20 is varied temporarily to the High side during the downshift in the subtransmission mechanism 30, and therefore the speed ratio of the variator 20 takes time to vary to the Lowest speed ratio. Accordingly, the vehicle may stop before the speed ratio of the variator 20 has varied to the Lowest speed ratio.

Hence, the transmission controller 12 determines whether or not the vehicle is decelerating rapidly, and when it is determined that the vehicle is decelerating rapidly, the transmission controller 12 does not perform the coordinated shift, namely, the transmission controller 12 sets a speed ratio variation amount of the variator 20 after the rapid deceleration determination in the opposite direction to the downshift of the subtransmission mechanism 30 to zero. Instead of performing the coordinated shift, the transmission controller 12 controls the gear position of the subtransmission mechanism 30 to the first speed and shifts the variator 20 toward the Lowest speed ratio at a maximum shift speed from the point at which rapid deceleration is determined to be underway in the vehicle (non-coordinated shift).

Figure 4:
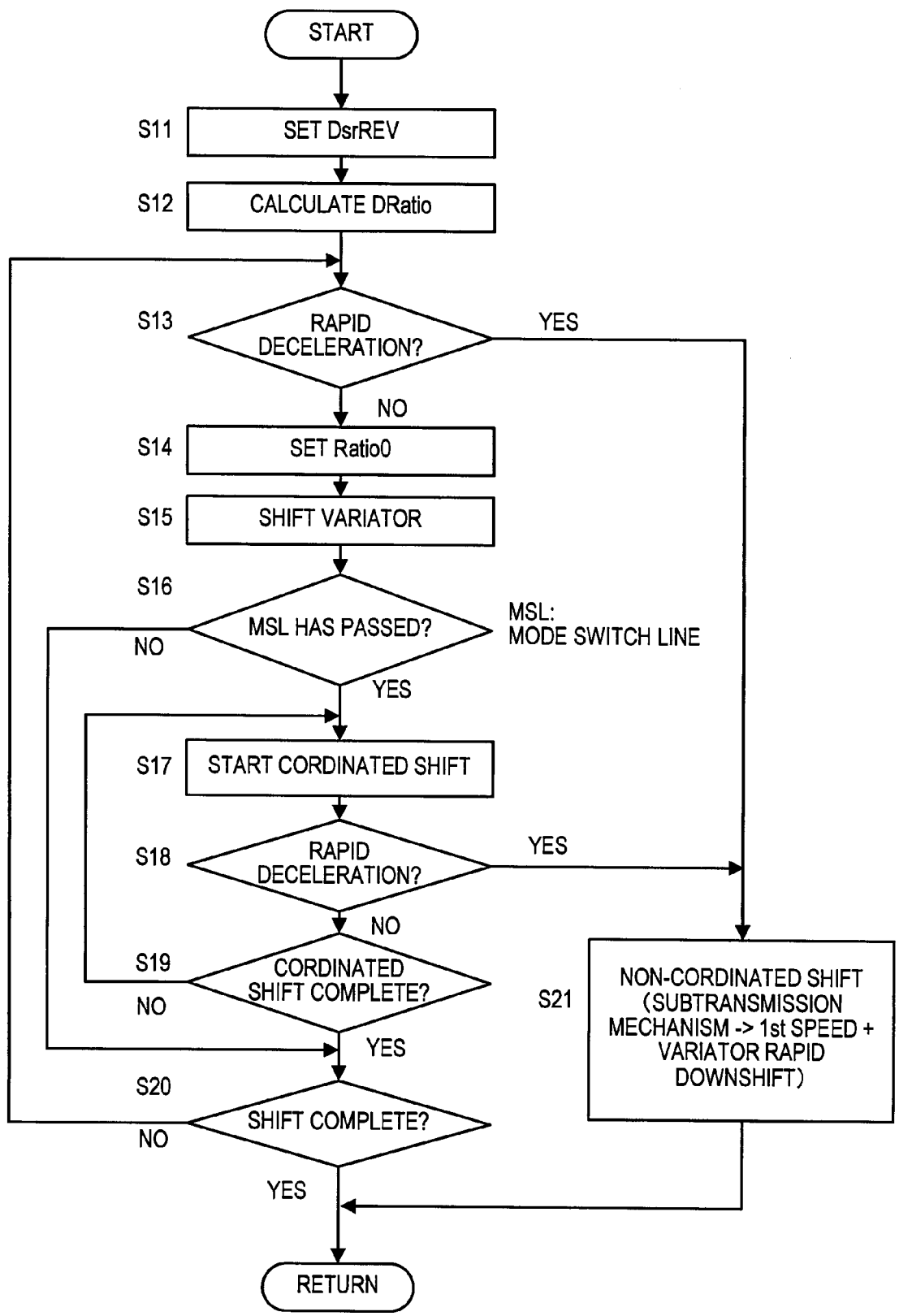
FIG. 4 is a flowchart showing the content of a shift control program executed by the transmission controller.

FIG. 4 shows an example of the shift control program stored in the memory device 122 of the transmission controller 12. The specific content of the shift control executed by the transmission controller 12 will now be described with reference to FIG. 4.

In S11, the transmission controller 12 searches the shift map shown in FIG. 3 for a value corresponding to the current vehicle speed VSP and accelerator opening APO, and sets this value as a destination primary rotation speed DsrREV. The destination primary rotation speed DsrREV is a primary rotation speed to be reached at the current vehicle speed VSP and accelerator opening APO, and serves as a steady-state target value of the primary rotation speed.

In S12, the transmission controller 12 calculates a destination through speed ratio DRatio by dividing the destination primary rotation speed DsrREV by the vehicle speed VSP and a final reduction ratio fRatio of the final reduction gear 6. The destination through speed ratio DRatio is a through speed ratio to be reached at the current vehicle speed VSP and accelerator opening APO, and serves as a steady-state target value of the through speed ratio.

In S13, the transmission controller 12 determines whether or not the vehicle is decelerating rapidly. Here, rapid deceleration is defined as deceleration that is sufficiently strong to stop the vehicle.

Rapid deceleration may be determined by determining variation in the vehicle speed VSP per unit time, or in other words a deceleration, and then determining whether or not a state in which the deceleration exceeds a predetermined rapid deceleration determination threshold has continued for a predetermined time or more. It should be noted that the rapid deceleration determination method is not limited to this method, and instead, a sensor that detects a brake pedal pressure may be provided such that rapid deceleration is determined an the basis of the brake pedal pressure, for example. When it is determined that the vehicle is decelerating rapidly, the processing advances to S21, and when a negative determination is made, the processing advances to S14.

In S14, the transmission controller 12 sets a target through speed ratio Ratio0 for varying the actual through speed ratio Ratio from the value thereof at the start of the shift to the destination through speed ratio DRatio at a predetermined transient response. The target through speed ratio Ratio0 is a transient target value of the through speed ratio. The predetermined transient response is a first order lag response, for example, which is set such that the target through speed ratio Ratio0 gradually approaches the destination through speed ratio DRatio. The actual through speed ratio Ratio is calculated whenever required on the basis of the current vehicle speed VSP and primary rotation speed Npri (likewise hereafter).

In S15, the transmission controller 12 controls the actual through speed ratio Ratio to the target through speed ratio Ratio0. More specifically, the transmission controller 12 calculates a target speed ratio vRatio0 of the variator 20 by dividing the target through speed ratio Ratio0 by the speed ratio of the subtransmission mechanism 30, and controls the variator 20 such that an actual speed ratio vRatio of the variator 20 becomes the target speed ratio vRatio0. As a result, the actual through speed ratio Ratio follows the destination through speed ratio DRatio at the predetermined transient response.

In S16, the transmission controller 12 determines whether or not the actual through speed ratio Ratio has passed the mode shift line (the mode switch speed ratio mRatio). When an affirmative determination is made, the processing advances to S17, and when a negative determination is made, the processing advances to S20.

In S17, the transmission controller 12 begins the coordinated shift. In the coordinated shift, the transmission controller 12 performs a shift in the subtransmission mechanism 30 (when the current gear position is the first speed, the upshift and when the current gear position is the second speed, the downshift), and varies the actual speed ratio vRatio of the variator 20 in the opposite direction to the speed ratio variation direction of the subtransmission mechanism 30 to ensure that a step does not occur in the actual through speed ratio Ratio on either side of the coordinated shift.

Here, the shift performed in the subtransmission mechanism 30 is constituted by a preparatory phase in which oil pressure is precharged to a frictional engagement element to be engaged, a torque phase extending from the start of torque transmission via the frictional engagement element to be engaged (the High clutch 33 in the case of the upshift and the Low brake 32 in the case of the downshift) to the start of variation in the speed ratio of the subtransmission mechanism 30, an inertia phase extending from the start of variation in the speed ratio of the subtransmission mechanism 30 to a point at which the speed ratio becomes constant, and a final phase in which the oil pressure of the frictional engagement element to be engaged is raised to a MAX oil pressure such that the frictional engagement element to be engaged is fully engaged. The transmission controller 12 shifts the variator 20 in coordination with the inertia phase, in which the speed ratio of the subtransmission mechanism 30 actually varies, such that the actual through speed ratio Ratio remains constant throughout the entire coordinated control process.

In S18, the transmission controller 12 determines whether or not the vehicle is decelerating rapidly, similarly to S13. The reason for determining rapid deceleration again is that when the vehicle decelerates rapidly during the coordinated shift, the transmission controller 12 halts the coordinated shift and switches to a non-coordinated shift to be described below. When rapid deceleration is determined to be underway in the vehicle, the processing advances to S21, and when a negative determination is made, the processing advances to S19.

In S19, the transmission controller 12 determines whether or not the coordinated shift is complete. When the coordinated shift is not complete, the processing returns to S17, and when the coordinated shift is complete, the processing advances to S20.

In S20, the transmission controller 12 determines whether or not the shift is complete. More specifically, the transmission controller 12 determines that the shift is complete when a deviation between the actual through speed ratio Ratio and the destination through speed ratio DRatio is smaller than a predetermined value. When it is determined that the shift is complete, the processing is terminated, and when it is determined that the shift is not complete, the processing of S13 to S20 is repeated until it is determined that the shift is complete.

Meanwhile, when rapid deceleration is determined to be underway in the vehicle in S13 or S18, the processing advances to S21. In S21, the coordinated shift described above is not performed, or if the coordinated shift is underway, the coordinated shift is halted so that the speed ratio variation amount to the High side of the variator 20 accompanied by the downshift of the subtransmission mechanism 30 becomes zero. The non-coordinated shift described below is then executed.

In the non-coordinated shift, the transmission controller 12 controls the gear position of the subtransmission mechanism 30 to the first speed (when the gear position already corresponds to the first speed, the first speed is maintained, and when the gear position corresponds to the second speed, the downshift is executed) and shifts the variator 20 toward the Lowest speed ratio at a maximum shift speed from the point at which rapid deceleration is determined. Both shifts are begun at the same time, i.e. from the point at which rapid deceleration is determined, but executed individually without coordination.

The maximum shift speed of the variator 20 is a shift speed obtained when an oil pressure supplied to the primary pulley 21 is drained and a line pressure is supplied to the secondary pulley 22. The variator 20 is shifted at the maximum shift speed to ensure that the speed ratio of the variator 20 is as close as possible to the Lowest speed ratio when the vehicle stops.

Next, actions and effects of the above shift control will be described.

According to the shift control described above, the variator 20 and subtransmission mechanism 30 are controlled to achieve the destination through speed ratio DRatio determined in accordance with the operating conditions, and a coordinated shift is executed during the shift performed in the subtransmission mechanism 30 such that the actual through speed ratio Ratio remains constant on either side of the shift (S14 to S20).

However, when rapid deceleration is determined to be underway in the vehicle, the coordinated shift is not executed, or if the coordinated shift is already underway, the coordinated shift is halted. Namely, a speed ratio variation amount to the High side of the variator 20 accompanied by the downshift of the subtransmission mechanism 30 is set to zero. Then, a non-coordinated shift in which the variator 20 and the subtransmission mechanism 30 are shifted individually and the variator 20 is shifted toward the Lowest speed ratio at the maximum shift speed is then executed from the time point at which rapid deceleration is determined (S13, S18, S21).

Thus, the variator 20 can be brought as close as possible to the Lowest speed ratio during rapid deceleration such that even if the vehicle stops as a result of the rapid deceleration, a situation in which sufficient startup driving force cannot be generated during a subsequent startup, causing the startup performance to deteriorate, is prevented.

Since the coordinated shift is not executed, a step occurs in the actual through speed ratio Ratio on either side of the shift in the subtransmission mechanism 30, and as a result, shift shock occurs. However, during rapid deceleration, deceleration that exceeds the shift shock acts on the vehicle, and therefore the shift shock does not cause the driver to experience an unpleasant feeling and the drivability does not deteriorate.

Figure 5:
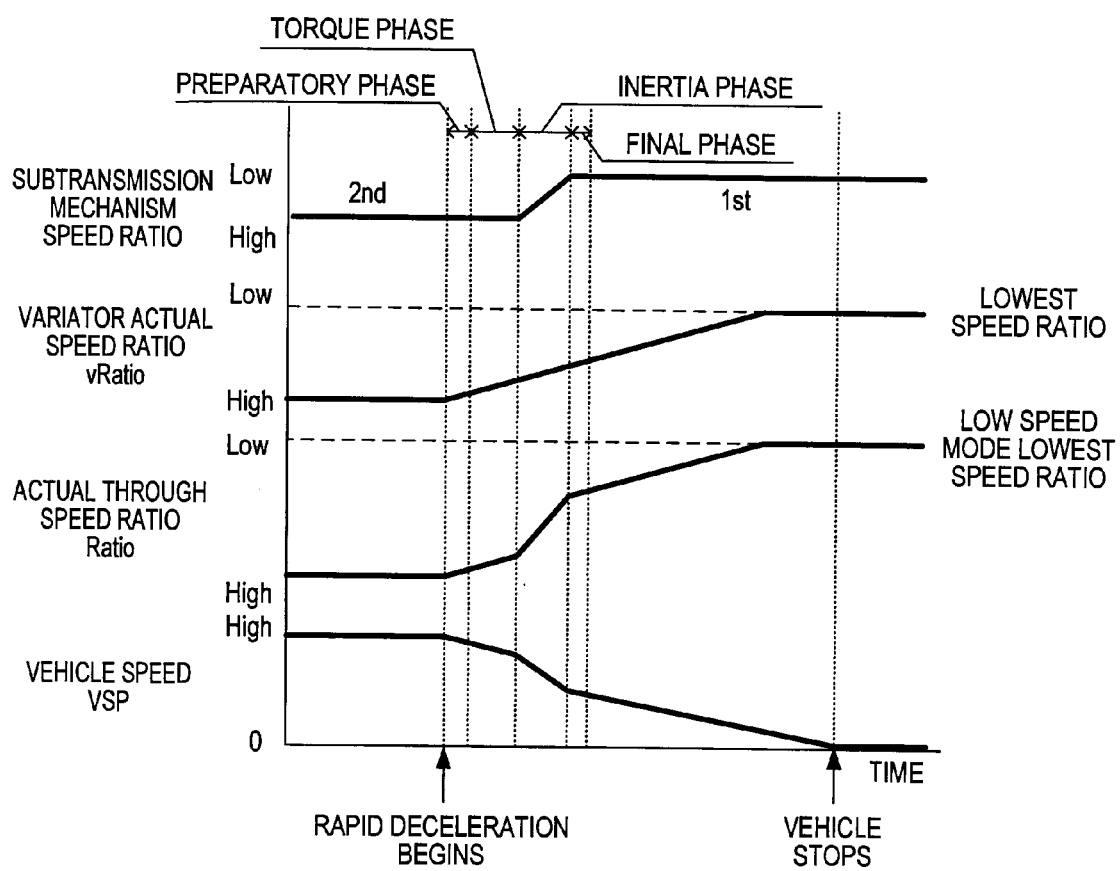
FIG. 5 is a timing chart for explaining actions and effects of an embodiment of this invention.

FIG. 5 is a time chart showing a case in which rapid deceleration begins during the shift control described above. When rapid deceleration begins, the downshift in the subtransmission mechanism 30 and a shift toward the Low side in the variator 20 begin immediately, and the two shifts are performed individually. Since the coordinated shift is not executed, the speed ratio of the variator 20 continues to vary to the Low side during the downshift in the subtransmission mechanism 30, leading to a corresponding reduction in the time required for the speed ratio of the variator 20 to reach the Lowest speed ratio.

As a result, in this example the speed ratio of the variator 20 is returned to the Lowest speed ratio before the vehicle stops, and therefore the subsequent startup can be performed without problems.

An embodiment of this invention was described above, but this embodiment is merely one example of application of this invention, and the technical scope of this invention is not limited to the specific constitutions of the embodiment.

For example, in the above embodiment, the mode switch line is set to overlap the low speed mode Highest line, but the mode switch line may be set to overlap the high speed mode Lowest line or set between the high speed mode Lowest line and the low speed mode Highest line. The mode switch line may be comprised of polygonal line similar to a shift line for a conventional step automatic transmission.

Further, in the above embodiment, the speed ratio variation amount of the variator 20 after the rapid deceleration determination in the opposite direction to the speed variation direction of the subtransmission mechanism 30 is set to zero, but the speed ratio variation amount of the variator 20 in the opposite direction may be decreased compared with the coordinated shift. Specifically, the speed ratio variation amount of the variator 20 to the High side accompanied by the downshift of the subtransmission mechanism 30 is decreased compared with the normal coordinated shift.

Further, in the above embodiment, the subtransmission mechanism 30 is a speed change mechanism having the first speed and second speed gear positions as forward gear positions, but the subtransmission mechanism 30 may be a speed change mechanism having three or more gear positions as forward gear positions.

Furthermore, the subtransmission mechanism 30 is formed using a Ravigneaux planetary gear mechanism, but is not limited to this constitution. For example, the subtransmission mechanism 30 may be constituted by a combination of a normal planetary gear mechanism and frictional engagement elements, or by a plurality of power transmission paths formed from a plurality of gear trains having different speed ratios, and frictional engagement elements for switching the power transmission paths.

Further, the V belt 23 may be comprised of a metal ring and a plurality of metal elements, but the V belt 23 may be comprised of an endless chain. The term "belt" in claims covers various types of belt which can be used for transmitting rotation between pulleys in a continuously variable transmission.

Further, the hydraulic cylinders 23a, 23b are provided as actuators for displacing the movable conical plates of the pulleys 21, 22 in the axial direction, but the actuators may be driven electrically rather than hydraulically.

Further, in the above embodiment, the power source is comprised of the engine 1, but an electric motor or a combination of an engine and an electric motor may be used as the power source.

This application claims priority based on Japanese Patent Application No. 2009-79679, filed with the Japan Patent Office on Mar. 27, 2009, the entire content of which is incorporated into this specification.

What is claimed is:

1. A continuously variable transmission installed in a vehicle, comprising:
   a variator capable of varying a speed ratio continuously;
   a subtransmission mechanism provided in series with the variator and having a first gear position and a second gear position, the second gear position having a smaller speed ratio than the first gear position, as forward gear positions;
   a coordinated shifting unit which, when a gear position of the subtransmission mechanism is changed, performs a coordinated shift in which the subtransmission mechanism is shifted and the variator is shifted in an opposite direction to a speed ratio variation direction of the subtransmission mechanism; and
   a non-coordinated shifting unit which, when a rapid deceleration is performed in a situation where the second gear position is selected by the subtransmission mechanism, downshifts the subtransmission mechanism from the second gear position to the first gear position and downshifts the variator without performing the coordinated shift.

2. The continuously variable transmission as defined in claim 1, wherein, when the rapid deceleration is determined to be underway, the non-coordinated shifting unit shifts the variator and the subtransmission mechanism to a Low side individually without coordination.

3. The continuously variable transmission as defined in claim 1, wherein, when the rapid deceleration is determined to be underway, the non-coordinated shifting unit starts the downshift of the subtransmission mechanism from a time point at which the rapid deceleration is determined to be underway.

4. The continuously variable transmission as defined in claim 1, wherein the non-coordinated shifting unit shifts the variator at a maximum shift speed when shifting the variator to a Low side.

5. The continuously variable transmission as defined in claim 1, wherein, when the rapid deceleration is determined to be underway during execution of the coordinated shift, the non-coordinated shifting unit halts the coordinated shift, and controls the gear position of the subtransmission mechanism to the first gear position and shifts the variator to a Low side from a time point at which the rapid deceleration is determined to be underway.

6. A control method for a continuously variable transmission that is installed in a vehicle and includes a variator capable of varying a speed ratio continuously, and a subtransmission mechanism provided in series with the variator and having a first gear position and a second gear position, the second gear position having a smaller speed ratio than the first gear position, as forward gear positions, the method comprising:
    a coordinated shifting step, when a gear position of the subtransmission mechanism is changed, for performing a coordinated shift in which the subtransmission mechanism is shifted and the variator is shifted in an opposite direction to a speed ratio variation direction of the subtransmission mechanism; and
    a non-coordinated shifting step which, when a rapid deceleration is performed in a situation where the second gear position is selected by the subtransmission mechanism, downshifts the subtransmission mechanism from the second gear position to the first gear position and downshifts the variator without performing the coordinated shift.

7. The control method as defined in claim 6, wherein, when the rapid deceleration is determined to be underway, the non-coordinated shifting step shifts the variator and the subtransmission mechanism to a Low side individually without coordination.

8. The control method as defined in claim 6, wherein, when the rapid deceleration is determined to be underway, the non-coordinated shifting step starts the downshift of the subtransmission mechanism from a time point at which the rapid deceleration is determined to be underway.

9. The control method as defined in claim 6, wherein the non-coordinated shifting step shifts the variator at a maximum shift speed when shifting the variator to a Low side.

10. The control method as defined in claim 6, wherein, when the rapid deceleration is determined to be underway during execution of the coordinated shift, the non-coordinated shifting step halts the coordinated shift, and controls the gear position of the subtransmission mechanism to the first gear position and shifts the variator to a Low side from a time point at which the rapid deceleration is determined to be underway.

11. A continuously variable transmission installed in a vehicle, comprising:
    a variator capable of varying a speed ratio continuously;
    a subtransmission mechanism provided in series with the variator and having a first gear position and a second gear position, the second gear position having a smaller speed ratio than the first gear position, as forward gear positions;
    coordinated shifting means, when a gear position of the subtransmission mechanism is changed, for performing a coordinated shift in which the subtransmission mechanism is shifted and the variator is shifted in an opposite direction to a speed ratio variation direction of the subtransmission mechanism; and
    non-coordinated shifting means, when a rapid deceleration is performed in a situation where the second gear position is selected by the subtransmission mechanism, for downshifting the subtransmission mechanism from the second gear position to the first gear position and for downshifting the variator without performing the coordinated shift.

12. The continuously variable transmission as defined in claim 11, wherein, when the rapid deceleration is determined to be underway, the non-coordinated shifting means shifts the variator and the subtransmission mechanism to a Low side individually without coordination.

13. The continuously variable transmission as defined in claim 11, wherein, when the rapid deceleration is determined to be underway, the non-coordinated shifting means starts the downshift of the subtransmission mechanism from a time point at which the rapid deceleration is determined to be underway.

14. The continuously variable transmission as defined in claim 11, wherein the non-coordinated shifting means shifts the variator at a maximum shift speed when shifting the variator to a Low side.

15. The continuously variable transmission as defined in claim 11, wherein, when the rapid deceleration is determined to be underway during execution of the coordinated shift, the non-coordinated shifting means halts the coordinated shift, and controls the gear position of the subtransmission mechanism to the first gear position and shifts the variator to a Low side from a time point at which the rapid deceleration is determined to be underway.

* * * * *